Sept. 16, 1958   B. R. HARP   2,851,842
FENCE ROW MOWER ATTACHMENT FOR FARM TRACTORS
Filed March 18, 1957   3 Sheets-Sheet 1
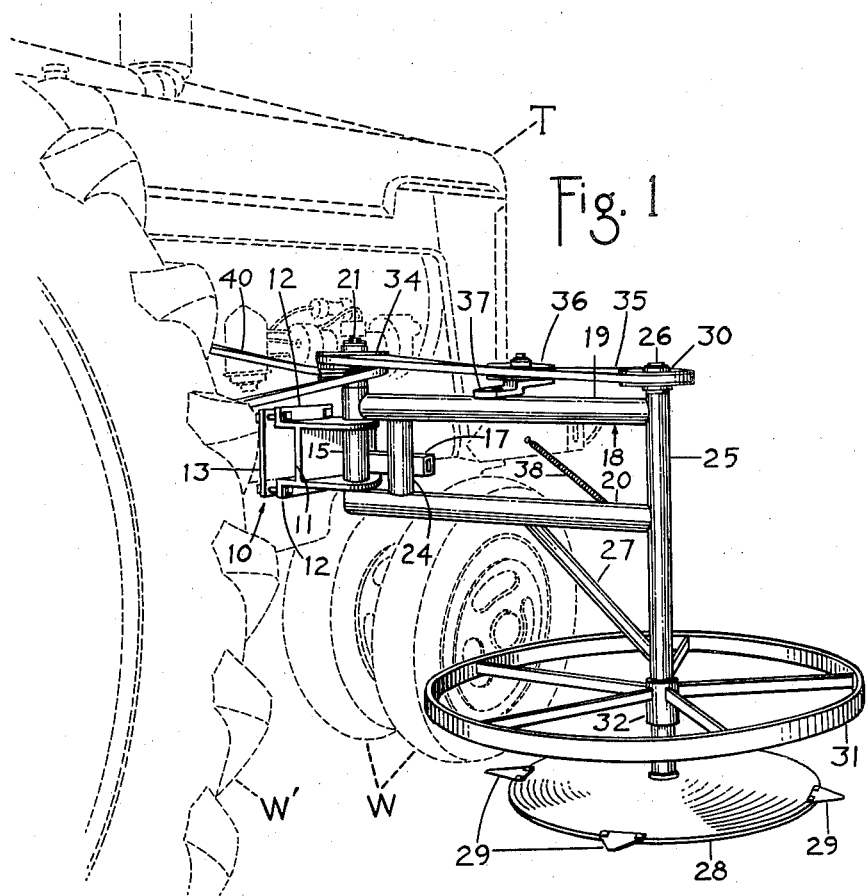
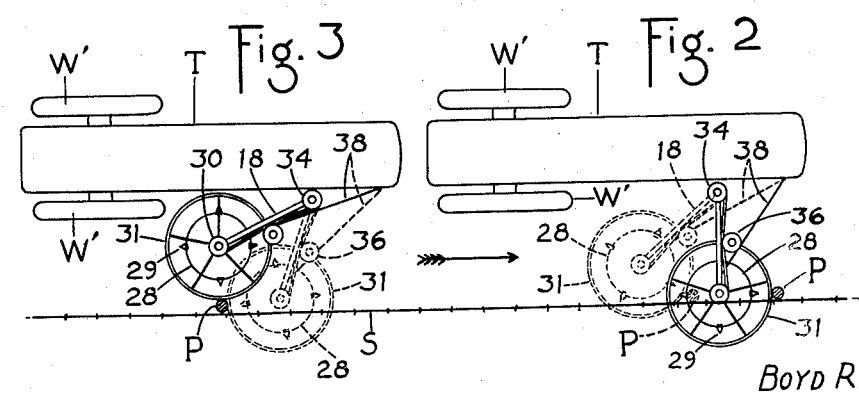
BOYD R. HARP
INVENTOR.

Sept. 16, 1958            B. R. HARP            2,851,842
FENCE ROW MOWER ATTACHMENT FOR FARM TRACTORS
Filed March 18, 1957            3 Sheets-Sheet 2
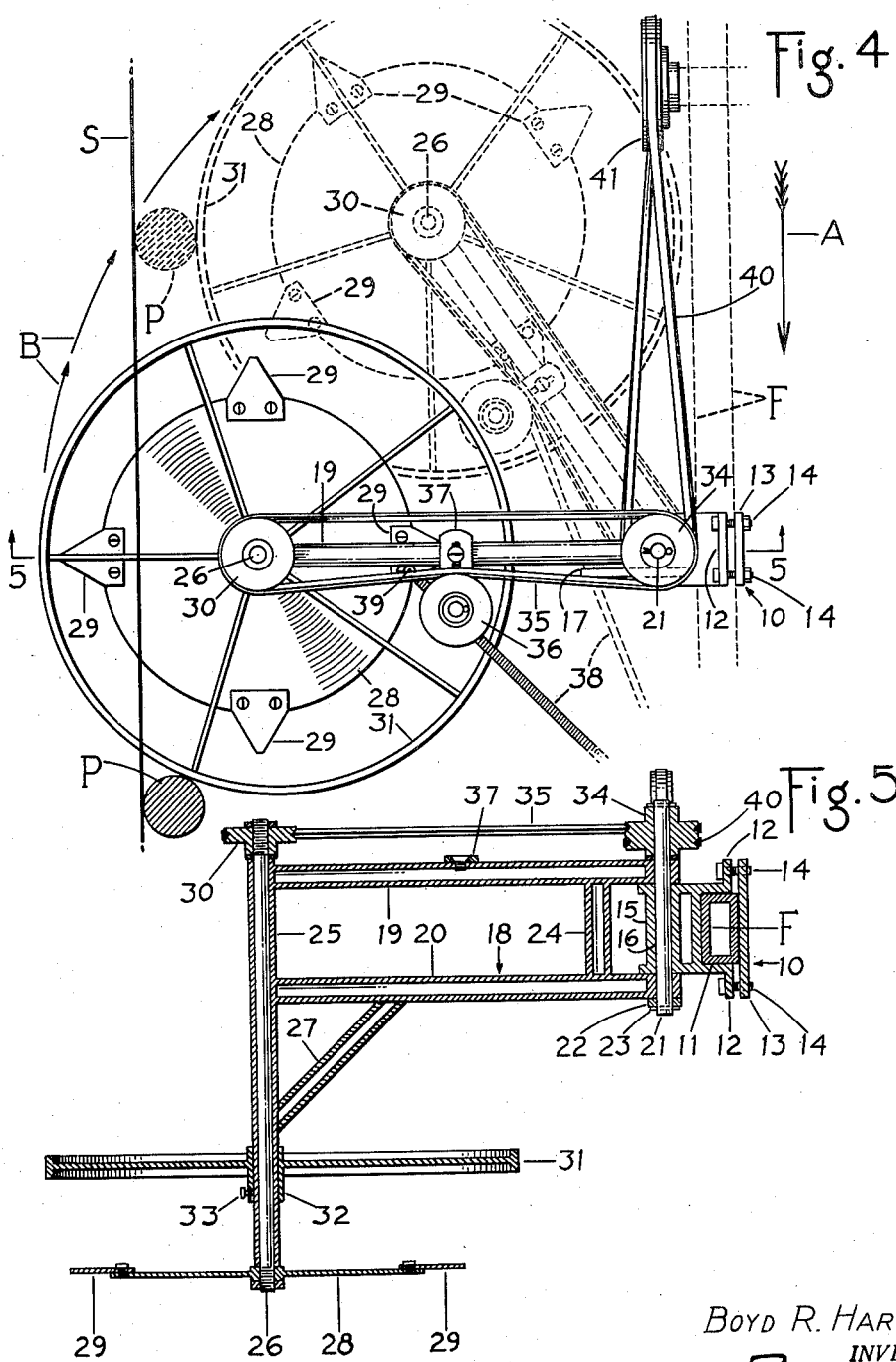
BOYD R. HARP
INVENTOR.
BY *[signature]*
ATTORNEY Sept. 16, 1958          B. R. HARP          2,851,842
FENCE ROW MOWER ATTACHMENT FOR FARM TRACTORS
Filed March 18, 1957          3 Sheets-Sheet 3
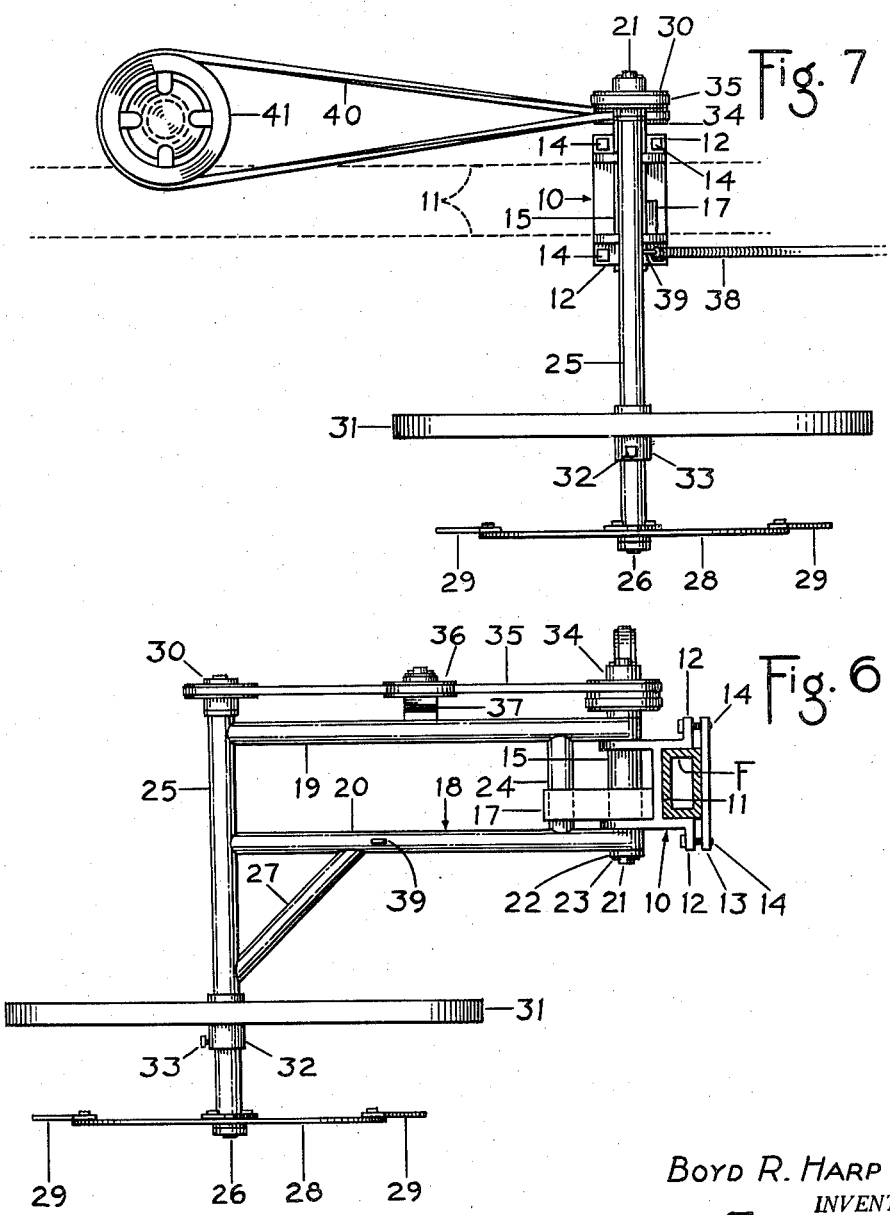
Boyd R. Harp
INVENTOR.
BY
ATTORNEY United States Patent Office 2,851,842
Patented Sept. 16, 1958

2,851,842

FENCE ROW MOWER ATTACHMENT FOR FARM TRACTORS

Boyd R. Harp, Decatur, Ill.

Application March 18, 1957, Serial No. 646,583

2 Claims. (Cl. 56—25.4)

This invention relates to a fence row mower attachment for farm tractors.

Heretofore, considerable difficulty has been experienced, particularly by farmers to keep their fence rows clear of grass and weeds.

While the growth of both grass and weeds in fence rows distract from neatness, the weeds are in particular objectionable in that the seeds thereof are distributed over a relatively wide area of ground with a resulting damage to crops.

While farm fences in general comprise spaced posts interconnected by longitudinal vertically spaced members, usually of wire with the lowermost stand thereof spaced from the ground sufficient to receive a power driven cutting member such as a cutter bar, the relatively closely spaced posts would be in the path of the cutter bar and cutting could be carried out only by zig-zagging the mowing machine which would be a difficult operation and then many weeds would remain adjacent the successive posts.

For the above reasons, it has heretofore been almost the exclusive practice to mow the fence rows by hand in the use of a scythe or the like.

It is accordingly a general object of the present invention to provide a power mower for cutting grass and weeds in fence rows including longitudinally spaced vertical posts interconnected by vertically spaced longitudinal wire strands with the lowermost strand in vertical spaced relation to the ground as in common practice, and wherein the mower operates beneath the said lowermost wire strand and automatically moves around the successive posts with a resulting cutting of substantially all weeds in the fence row.

A further object of the invention is the provision of a fence row mower having the above noted characteristics which is in the form of an attachment and which is adapted for ready mounting on a farm tractor.

Other objects and advantages of the invention will become apparent in the course of the following detailed description, taken in connection with the accompanying drawings, wherein—

Fig. 1 is a perspective view of the improved mower attachment shown in operative association with a farm tractor, indicated fragmentally by dotted lines.

Fig. 2 is a reduced schematic top plan view of a tractor and the mower operatively associated therewith and disclosing in particular the automatic movement of the cutting member about a fence post.

Fig. 3 is a view similar to Fig. 2 wherein the cutting member is in a post clearing position.

Fig. 4 is an enlarged top plan view disclosing in particular the co-action of a cutting member guard wheel with a fence post.

Fig. 5 is a vertical sectional view as observed in the plane of line 5—5 on Fig. 4.

Fig. 6 is an elevational view corresponding to Fig. 5 but with the tractor frame in section.

Fig. 7 is an elevational view as observed from the left of Fig. 6.

Referring now in detail to the drawings, the improved mower attachment is adapted for use with a tractor T including a side frame member F and front and rear wheels, W, W'.

The mower attachment comprises a bracket 10 which is removably secured to the tractor side frame member F and which provides a frame receiving recess 11, outwardly of which are opposite vertical flanges 12 and the bracket further comprises a rectangular plate 13 engageable with the inner wall of frame F and which is secured to flanges 12 by means of bolts 14 whereby the bracket is rigidly but removably secured to the side frame member.

The bracket 10 further comprises a cylindrical vertical bearing post 15 having an axial aperture 16. A stop bar 17 projects outwardly from said bracket 10 for a purpose later to appear.

The mower attachment further comprises a cutter member supporting and guiding frame 18 which is bodily movable about the axis of said bearing post 15 and which includes a pair of vertically spaced upper and lower horizontal cylindrical bars 19 and 20 whose inner ends are apertured and through which and the bearing aperture 16 extends a vertical king pin 21 whose lower end is provided with a washer 22 and a retaining cotter pin 23.

The said frame bars 19 and 20 are rigidly connected adjacent their said inner ends by means of a vertical cylindrical bar 24.

The outer ends of said frame bars 19 and 20 are rigid with a relatively long tubular bearing post 25 in which is rotatably journalled a vertical spindle 26. The said bearing post 25 projects a substantial distance below the frame bar 20 and accordingly a diagonal brace bar 27 has its opposite ends rigidly connected to said bar 20 and the bearing post 25.

A cutter blade disc 28 is secured to the lower end of the spindle 26 and same is provided with a plurality of cutter blades 29 and the upper end of spindle 26 is provided with a V-belt pulley 30.

A guard wheel 31 is adjustably supported in rigid position on the bearing post 25 and for this purpose same comprises a tubular hub 32 which is secured to said bearing post by means of a screw 33.

The upper end of the king pin 21 is provided with a dual V-belt pulley 34 and a V-belt 35 is engaged with pulley 30 and the upper belt groove in pulley 34, as clearly shown in Fig. 5.

A tension pulley 36 for the belt 35 is adjustably secured to the bar 19 by means of a bracket 37.

The frame 18 is normally yieldably retained in right angular relation to the tractor side frame member F by means of an elongated coil spring 38, one end of which is suitably secured to the tractor frame, and the opposite end of which is secured to a metal loop 39 on the bar 20.

In the normal position of the frame 18 the bar 24 engages the stop bar 17.

The pulley 34 is connected to the source of tractor power by means of a belt 40 operatively engaged with pulley 34 and a tractor pulley 41.

Having set forth the structure in accordance with a preferred structural embodiment of the invention, the operation thereof is as follows:

Both the cutter disc 28 and the guard wheel 31 are adapted to operate beneath the usual lower wire strand S of a fence including horizontally spaced vertical posts P.

As indicated diagrammatically in Figs. 2 and 3, the tractor T is moving in the direction of the arrow.

According to Fig. 2, the guard wheel 31 shown in solid lines has just contacted a post P and as the tractor T moves forward the wheel 31 and cutter disc 28 swing rearwardly with the wheel following and continuing its contact with the post until the guard wheel swings back into normal position, as shown by dotted lines in Fig. 3.

As is more clearly indicated in Fig. 4, wherein the arrow A indicates the direction of movement of the tractor, it will be seen that upon contact of the wheel 31 with a post P (solid lines) the wheel will continue to move inwardly in contact with the post, as indicated in dotted lines and wherein the movement of the wheel will be in an arc as indicated by the arrows B.

Upon passing the post the wheel 31 and cutter disc 28 will move outwardly to normal position and substantially little grass or weeds will be left adjacent the posts.

Since the arcuate movement of the frame 18 is about the axis of the pulley 34, the drive will remain effective throughout the angular range of the frame.

Having set forth my invention in accordance with a preferred structural embodiment thereof, what I claim and desire to secure by U. S. Letters Patent is—

1. A fence row mower attachment for use in combination with a tractor having a side frame member and a power take-off pulley; comprising a bracket engageable with said side frame member, said bracket comprising a cylindrical bearing post whose axis is vertically disposed in the assembled position of said bracket, a stop bar rigid with said bracket and extending beyond said bearing post at right angles thereto, said bearing post having an axial aperture therein, a king pin disposed in said aperture, a horizontally elongated frame including a pair of vertically spaced parallel bars having corresponding ends thereof pivotally supported on said king pin, the opposite ends of said bars being rigid with a vertically disposed bearing post extending substantially below the lowermost one of said bars, a spindle rotatably supported in said bearing post, a cutter blade disc secured to the lower end of said spindle, a fence post engageable guard wheel secured to the lower end of said bearing post in vertically spaced parallel relation to said cutter blade disc, a pulley secured to the upper end of said spindle, a pulley rotatably supported on the upper end of said king pin, a belt operatively engaged with said pulleys, a second belt operatively engaged with said last pulley and said take-off pulley, and a tension pulley supported by the uppermost one of said bars for tensioning said first belt.

2. A fence row mower attachment according to claim 1, together with a vertically disposed bar rigid with said spaced parallel bars and disposed adjacent said bearing post, and an elongated coil spring having one end thereof connected to said tractor frame member and the opposite end thereof connected to the lowermost one of said parallel bars for moving said frame to a normal position wherein said vertically disposed bar engages said stop bar.

References Cited in the file of this patent

UNITED STATES PATENTS

| | | |
|---|---|---|
| 2,494,271 | Turner et al. | Jan. 10, 1950 |
| 2,529,797 | Cauble | Nov. 14, 1950 |
| 2,662,561 | Duncan | Dec. 15, 1953 |
| 2,791,081 | Allen et al. | May 7, 1957 |